(12) United States Patent
Datta

(10) Patent No.: US 7,815,784 B2
(45) Date of Patent: Oct. 19, 2010

(54) ELECTRO-COMPOSITE COATING FOR FLEXIBLE SEALS AND METHOD OF APPLYING THE SAME

(75) Inventor: Amitava Datta, East Greenwich, RI (US)

(73) Assignee: Advanced Components & Materials, Inc., East Greenwich, RI (US)

( * ) Notice: Subject to any disclaimer, the term of this patent is extended or adjusted under 35 U.S.C. 154(b) by 1243 days.

(21) Appl. No.: 11/159,577

(22) Filed: Jun. 23, 2005

(65) Prior Publication Data

US 2010/0096811 A1 Apr. 22, 2010

Related U.S. Application Data

(60) Provisional application No. 60/582,207, filed on Jun. 23, 2004.

(51) Int. Cl.
C25D 15/00 (2006.01)
C25D 5/02 (2006.01)
C25D 7/00 (2006.01)

(52) U.S. Cl. ............ 205/109; 205/118; 205/122; 205/133; 205/136; 205/149

(58) Field of Classification Search ........... 205/109, 205/118, 122, 149, 133, 136
See application file for complete search history.

(56) References Cited

U.S. PATENT DOCUMENTS

| 4,673,468 | A | * | 6/1987 | Myers et al. ............ 205/101 |
| 5,385,760 | A | | 1/1995 | Schassberger et al. ... 427/443.1 |
| 5,496,463 | A | * | 3/1996 | Mori et al. ............ 205/109 |
| 5,558,758 | A | * | 9/1996 | Foster ................... 205/50 |
| 5,766,690 | A | | 6/1998 | Derby et al. ............ 427/450 |
| 5,769,604 | A | | 6/1998 | Gardner et al. ......... 415/170.1 |
| 6,186,508 | B1 | | 2/2001 | Zajchowski et al. ..... 277/355 |
| 6,398,224 | B1 | | 6/2002 | Erb et al. .............. 277/592 |
| 6,399,153 | B1 | * | 6/2002 | Kephart ................. 427/282 |
| 6,505,837 | B1 | | 1/2003 | Heshmat ................ 277/411 |
| 6,764,219 | B2 | | 7/2004 | Doll et al. ............. 384/565 |
| 6,815,099 | B1 | | 11/2004 | Zajchowski et al. ..... 428/698 |
| 2003/0127807 | A1 | | 7/2003 | More et al. ............ 277/628 |

FOREIGN PATENT DOCUMENTS

| EP | 1 306 589 | 5/2003 |
| FR | 2 616 452 | 12/1988 |
| GB | 1 358 538 | 7/1974 |

OTHER PUBLICATIONS

Meggitt Aerospace and BAJ Coatings Limited sales brochure, "Tribomet T104C and T104CS Wear Control Coatings", undated.

* cited by examiner

Primary Examiner—Harry D. Wilkins, III
Assistant Examiner—Nicholas A. Smith
(74) Attorney, Agent, or Firm—BainwoodHuang

(57) ABSTRACT

An electro-composite tribological coating for coating a flexible or compliant structure, for example a structural seal, includes a cobalt and cobalt alloy base containing a fine dispersion of tribologically suitable particles such as chromium carbide ($Cr_3C_2$), silicon carbide (SiC), carbon graphite, and the like, which can be deposited directly on the outer surface of the seal as a near-net shape coating requiring little or no mechanical polishing or grinding. The coating is deposited on the seal in one embodiment by an electrolytic bath. In this manner, a near-net shape coating of a desirable thickness, for example having a thickness of about 0.005" and a desirable surface finish can be achieved in the as-plated condition with little or no additional polishing or grinding after coating.

10 Claims, 3 Drawing Sheets

$H_C$ = Compressed Height        $H_O$ = Free Height

ELECTRO-COMPOSITE COATING FOR FLEXIBLE SEALS AND METHOD OF APPLYING THE SAME

CROSS REFERENCES TO RELATED APPLICATIONS

The present application claims the benefit of U.S. Provisional Application No. 60/582,207, filed Jun. 23, 2004. The entire contents of the 60/582,207 application is incorporated herein by reference in its entirety.

TECHNICAL FIELD

This invention relates generally to a wear resistant coating for a flexible component, and more particularly, to a seal with a compliant cross-section that has an electro-composite tribological coating deposited on its outer sealing surface and a method of applying the coating.

BACKGROUND

The use of structural seals for sealing fluids under pressure, for example in gas turbine engines, in order to prevent fluid leakage is well known in the art. An assortment of structural seals have been developed with varying shapes such as the "C" shape, "U" shape, and "E" shape, as illustrated in FIGS. 1a-1c, respectively. In conventional applications the seals illustrated in FIGS. 1a-1c are installed in a cavity in a compressed condition by compressing the free height ($h_o$) of the seal cross section to an insertion or compressed height ($h_c$) see, for example, FIG. 2. In such conventional applications sealing is achieved via elastic spring-back under a combined load of both compression and fluid pressure. Such seals are referred to as compliant because they are able to be compressed and then expand in order to achieve sealing. The amount of seal compression, defined as the difference between the seal's free height and compressed height, i.e., $h_o$–$h_c$, provides a sealing load during use which is further augmented by the fluid pressure. As will be appreciated, the cross sections of these structural seals are designed to be compliant i.e., the seal cross sections are able to flex as the sealing surface, for example a flange, moves with respect to the second sealing surface (for example a second flange) while maintaining the seating load against the flanges, and hence, the cavity pressure (FIG. 2).

The flange movement is quite common in any high temperature pressurized chambers such gas turbine engines, where various segments are held together with the conventional structural seals placed in between. As the engine components heat up and cool down at differential rates, the flanges of different segments move both radially and axially with respect to each other. These movements are known to cause wear of the surface of the seal 1 and the contacting flanges 2 as the two surfaces under high mechanical contact pressure ($P_{mc}$) try to slide with respect to each other (FIG. 3). To minimize wear of the structural seals and the flanges, it is known to coat the seals with wear resistant coatings on the outer surface of the seal. Conventionally, the wear resistant coatings are applied by thermal spray techniques such as plasma spray or High Velocity Oxy Fuel (HVOF) of cermet (ceramic-metal composite) powders. Thermal sprayed coatings are generally very hard (>1000 VHN) but also less ductile (hence more brittle) than other coatings. This brittle nature can lead to coating failure by delamination during flexing of the seal in use. The delamination can then lead to three body wear of the thin compliant seal structure as particles (third body) can become trapped between the surfaces, which can result in seal failure.

When utilizing conventional application techniques such as thermal spraying, the seals need to be masked prior to spray in order to decrease the risk of coating inside the convolutions of the seal ("$c_i$"), which is undesirable. The outer convolutions ("$c_o$") are typically coated with a layer in the range of about 0.010"-0.020" in thickness which generally has high surface roughness in the as-sprayed condition. The seals may be mechanically polished to yield a thinner and smoother coating, which is desirable for seal applications, for example of about 0.005". In conventional spraying processes the compliant seal structure is supported within a specialized fixture in order to minimize any changes in the seal free height that could adversely affect seal performance. Because of the high hardness of these thermal sprayed coatings, the flange counterfaces that contact the seal should also be coated with thermal spayed coatings with similar hardness and then mechanically ground in order to prevent undue wear of the flange from contacting the thermally sprayed seal coating. In addition, the high hypersonic speeds at which the thermally sprayed coatings are applied can cause the seal to collapse, resulting in rejection of the seal.

While thermal sprayed coatings help prolong seal life by minimizing wear, they do suffer from a variety of shortcomings including the additional labor and cost associated with the mechanical polishing after thermal spray in order to achieve the desired thickness and surface finish; the high hardness of the coatings which can require additional thermal sprayed coating and grinding of the flanges; and the special equipment and labor associated with masking and spraying the seals to selectively coat and minimize change in the seal free height and the cost of rejecting or reworking seals that undergo unacceptable changes in seal height. In addition, the brittle nature of thermal sprayed coatings containing extremely high volume fraction of ceramic phases can lead to coating failure by delamination resulting from seal flexing and even to seal failure as detailed above.

In view of the foregoing, there is continued effort to develop suitable coatings for compliant structural seals that can successfully seal against uncoated flanges while being applied in a cost effective manner.

SUMMARY

In accordance with the present invention, there is provided an electro-composite tribological coating for coating a flexible or compliant structure, for example a compliant structural seal and a method of applying the coating to a desired thickness and surface finish without the need for secondary processing. According to one embodiment, the electro-composite coating includes a cobalt and cobalt alloy base containing a fine dispersion of tribologically suitable particles such as chromium carbide ($Cr_3C_2$), silicon carbide (SiC), carbon graphite, and the like, which may be deposited directly on the outer surface of the seal as a near-net shape coating requiring little or no mechanical polishing or grinding. The coating is preferably deposited at the desired thickness and finish by an electrolytic bath. In this manner, a near-net shape coating of a desirable thickness, for example having a thickness of about 0.005" and a desirable surface finish can be achieved in the as-plated condition with little or no additional secondary processing, for example polishing or grinding after coating.

BRIEF DESCRIPTION OF THE DRAWINGS

It should be understood that the drawings are provided for the purpose of illustration only and are not intended to define the limits of the invention. The present invention is not limited to the precise arrangements and instrumentalities shown in the drawings, and the drawings are not necessarily to scale, emphasis instead being placed upon illustrating the principles disclosed herein, wherein.

DESCRIPTION OF THE ILLUSTRATIVE EMBODIMENT

Figure 1A:
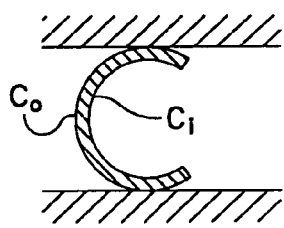
FIG. 1 is a cross-sectional view of conventional prior art metallic seal rings with (a) being a C-shaped seal, (b) being a U-shaped seal and (c) being a E-shaped seal.
Figure 1B:
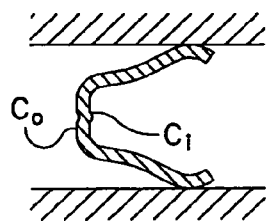
Figure 1C:
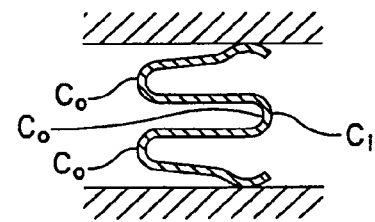
Figure 2:
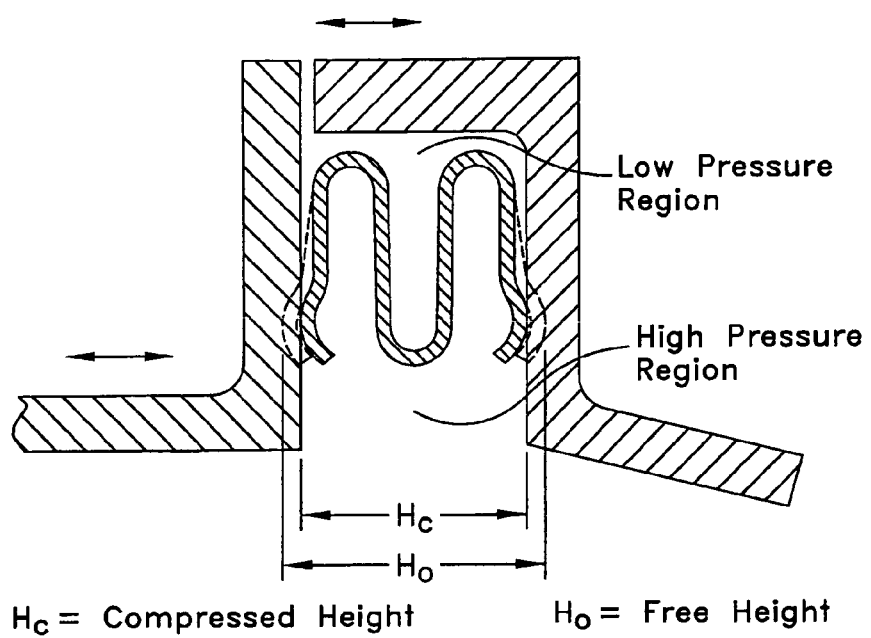
FIG. 2 is a schematic illustration of a prior art seal of FIG. 1 during sealing.
Figure 3:
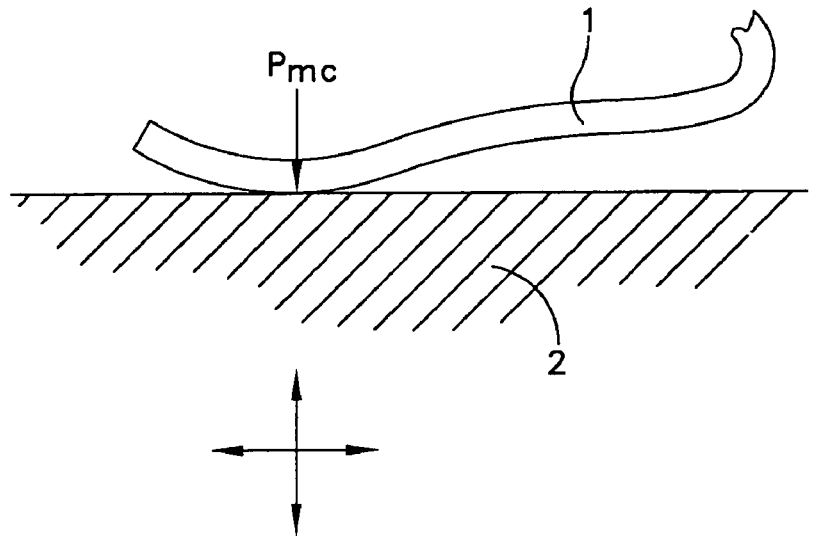
FIG. 3 is a schematic illustration of a contact pressure and relative movement at the sealing interface of a prior art seal.
Figure 4:
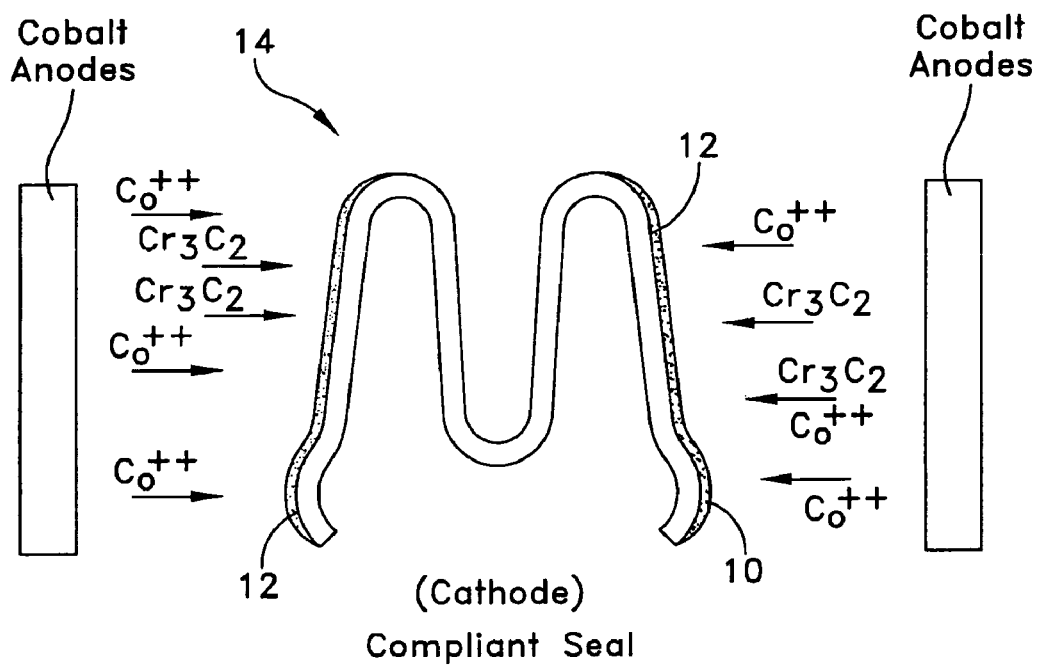
FIG. 4 is a schematic illustration of the co-deposition of Co and $Cr_3C_2$ particles according the to the present disclosure.
Figure 5:
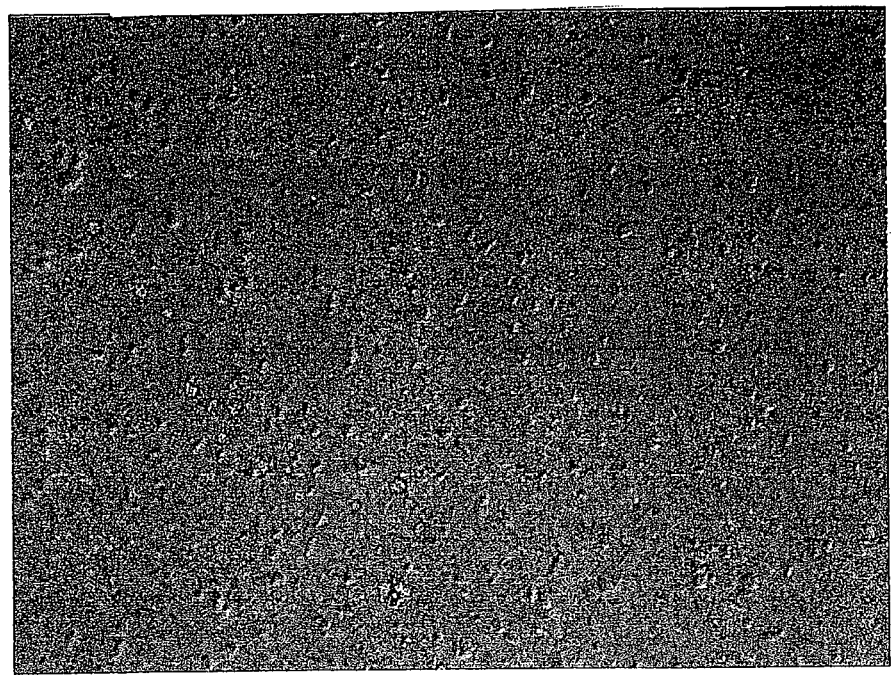
FIG. 5 is an SEM of electro-composite coating showing a fine distribution of $Cr_3C_2$ in a cobalt matrix according to one example of the present disclosure.
Figure 5:
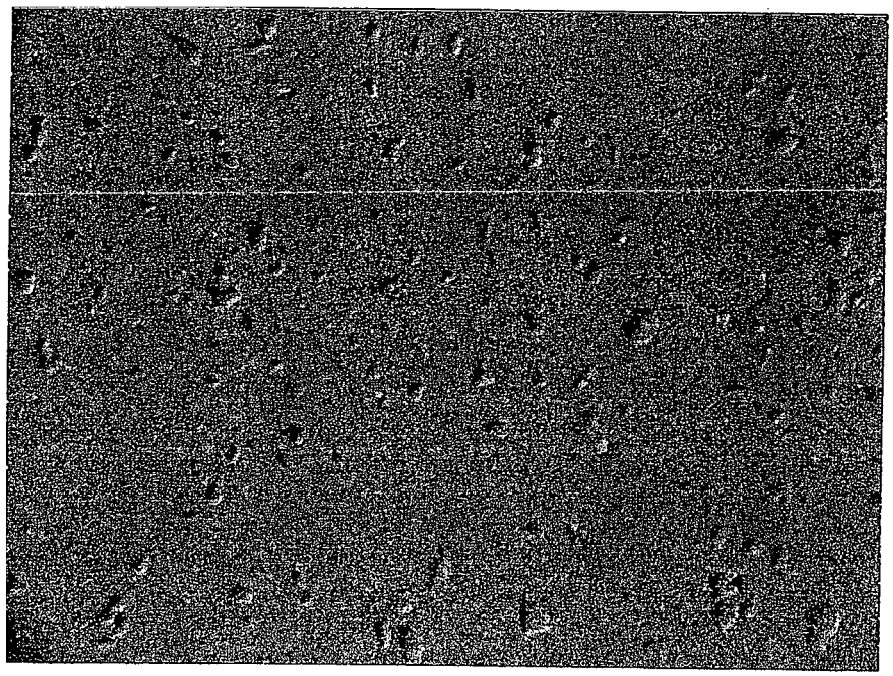

A flexible component coated with a tribological, electro-composite coating and method of coating the flexible component, particularly a compliant seal is illustrated in FIGS. 4-5. As used herein, the term "tribological coating" is used in the conventional sense to mean a coating that is wear resistant and which reduces friction between interacting surfaces. According to the present embodiment, the coating 10 is deposited only on the outer sealing surfaces 12 of the seal 14. The coating may particularly include a cobalt and cobalt alloy base or matrix containing a fine dispersion of tribologically suitable particles such as carbides, for example chromium carbide ($Cr_3C_2$), silicon carbide (SiC), tungsten carbide (WC), titanium carbide (TiC); solid lubricants such as carbon graphite (CG), molybdenum disulfide($MoS_2$), tungsten disulfide ($WS_2$); oxides such as alumina ($Al_2O_3$); nitrides such as silicon nitride ($Si_3N_4$), boron nitride (BN), and titanium nitride (TiN), and the like suitable for tribological applications. One such suitable coating that may particularly be utilized is TRIBOMET® T104C and T104CS available from BAJ Coatings Limited of Avon, England.

The electro-composite coating can be deposited directly on the outer sealing surface 12 of the seal by use of an electrolytic bath, the deposited coating requiring little or no mechanical polishing or grinding once deposited in order to meet acceptable standards for sealing, as described in greater detail below. In this manner, a near-net shape coating having a substantially uniform desired thickness, for example having a thickness of about 0.005" is distributed over the exterior sealing surface, and a desirable surface finish, i.e. smooth, can be achieved in the as-plated condition with little or no additional polishing or grinding after coating. As used herein, the term "sealing surface" refers at least to the surface that is used to contact and seal. The coating can be readily deposited on any of a variety of shapes of seals, for example "C" shape, "U" shape, and "E" shape, among others in a cost effective manner.

In the embodiment illustrated in FIG. 4, the electrolytic bath may particularly include a plating solution having the following composition:
 Cobalt Sulfate—530 gms/liter
 Cobalt Chloride—45 gms/liter
 Boric Acid—40 gms/liter and
 Chromium Carbide—50 gms/liter and an as-coated tribological particle size preferably less than about 4 microns in a cobalt or cobalt alloy matrix and most preferably between about 3-4 microns. The thickness of the coating may be selectively controlled by the current density (ampere per square inch) and plating time. The current density as used herein is defined as the total current divided by the surface area of the seal (or cathode) on which the coating is deposited. In the present embodiment, the current density may particularly be in the range of about 25-144 amps/sq. ft, with the ph being in the range of about 0.5-2; the temperature of the solution being in the range of about 120-180° F., with a medium to high agitation and soluble cobalt anodes. Most particularly, the plating conditions for the instant embodiment include a current density in the range of about 25-50 amps/sq. ft, the ph being in the range of about 0.8-1.2; the temperature of the solution being in the range of about 160-180° F., with strong mechanical stirring of the bath and soluble cobalt anodes. During coating it is desirable that the metallic ions and ceramic particles are kept in suspension so that they remain floating in the solution and do not settle to the bottom of the container. The particles utilized for the coating are quite heavy or have densities higher than the density or specific gravity of the plating solution which tends to make them settle toward the bottom of the bath which would inhibit them from being incorporated in the coating. As a result, mechanical stirring or agitation of the plating bath solution strong enough to keep the metallic ions and ceramic particles in suspension in order to prevent them from settling during the coating process is provided. Agitation may take the form of stirring with a mechanical stirrer or passing air bubbles through the plating solution, or the like, as would be known to those of skill in the art.

Because of the characteristics of the electrolytic bath utilized to deposit the electro-composite coating, the surface of the compliant seal does not require elaborate masking prior to coating, as shown in FIG. 4. As will be appreciated, eliminating the masking reduces the overall cost of the process for applying the coating as masking requires additional time and labor. The electrolytic bath may include metallic ions, for example $Co^{++}$ or $Ni^{++}$ co-deposited with fine ceramic particles for example $Cr_3C_2$, SiC and tungsten carbide (WC), as shown in FIG. 4 which are preferably kept in suspension, or may include other material composition, as discussed above. The compliant seal 14 is placed in the bath between anodes 16, for example cobalt anodes, and acts as a cathode in the present embodiment. As the electrical current is applied, the $Co^{++}$ or $Ni^{++}$ (in the embodiment of FIG. 4), the positively charged metallic ions migrate toward and deposited on the cathode (seal). The ceramic particles ($Cr_3C_2$) are co-deposited as a result of electrophoresis which is caused as a result of adsorption of positively charged ions present in the solution on the surface of ceramic particles. Because of this co-deposition of both the metallic and non-metallic tribological particles, a composite structure containing $Cr_3C_2$, SiC, or whatever tribological particles are chosen, are finely dispersed, i.e. having a dispersion in the range of about 10 microns, in a cobalt or cobalt alloy matrix, as illustrated by the scanning electron microscope pictures or FIG. 5.

By chemically activating the surface of the seal through the use of an electrolytic bath, a ductile tribological coating with an excellent metallurgical bond is deposited on the compliant seal surface without the need of high thermal and kinetic energy of the thermal spray. Hence, the seal height does not appreciably change and seal collapse is not a concern as with the prior art sprayed coatings. In addition, the coating is deposited only on the surface of the seal closest to the anodes, i.e. the outer surface, due to the shadowing effect whereby the particles are attracted to the closest surface and not to the surface that lies within, i.e. in the shadow and out of direct line.

In the present embodiment, the particle size of the majority of the tribological particles (i.e. 50% or more) as deposited on the seal may particularly be in the range of about 2-5 µm and most particularly 80% or more of the particles being less than about 4 µm in size. The volume fraction of the particles within the matrix may particularly be in the range of about 15-30%. For the present embodiment, the weight % of the tribological particles may particularly be less than about 50 wt %, and more particularly about 25 wt %. The hardness of the coating may particularly be in the range of about 300-500 HVN, which is generally only slightly higher than the hardness of mating surfaces such as precipitation hardened superalloy flanges. Hence, the counterfaces or the flanges should not require any expensive additional coating and/or grinding due to the coating of the seals, thus reducing labor and cost. The electrodeposited coatings can be characterized as having either fine columnar or equiaxed grains, unlike the "splat" like layers of prior art thermal sprayed coatings which tend to delaminate and lead to three-body wear.

The present disclosure will be further illustrated by the following example, which is intended to be illustrative in nature and is not to be considered as limiting the scope of the disclosure.

EXAMPLE 1

Table 1 illustrates the wear characteristics of an electro-composite coating according to the present disclosure compared to a thermal sprayed coating of the prior art running against an uncoated superalloy substrate. The wear tests were carried out at room temperature using oscillating pins pressed against wear pads. The pins were coated with an electro-composite coating of cobalt containing about 12-25 vol. % $Cr_3C_2$ and a thermal sprayed coating T-800 (aka Tribaloy® coating which was developed by Dupont and is currently available from Stellite Coatings of Goshen, Ind.)

The wear pads are made from uncoated heat treated INCONEL® 718 manufactured by Special Metals Inc. of Huntington, W. Va. Table 1 summarizes weight loss values of both pins and pads.

TABLE 1

Comparison of wear characteristics of electro composite and thermal sprayed coatings running against uncoated INCONEL ® 718 alloy

| Wear Pair | Pin weight loss (mg) | Pad weight loss (mg) |
|---|---|---|
| Co/Cr3C2 electro composite coated pin against uncoated INCONEL ® 718 alloy | 0.2 | 0.2 |
| Thermal sprayed T-800 coated pin against uncoated INCONEL ® 718 alloy | 8.5 | 0.5 |

Lower weight loss values of $Co/Cr_3C_2$ electro composite coated pin against uncoated 718 pad compared to those of thermal sprayed T-800 pin against uncoated 718 pad substantiate a superior wear performance against uncoated substrates.

Details of the oscillating wear test conditions are as follows.

| | |
|---|---|
| Motion | Oscillatory, 0.1 inch (0.254 cm) |
| Frequency | 15 cycles/min |
| Temperature | 68 F. (20° C.) |
| Test duration | 1000 cycles |
| Sample geometry | Chamfered pin against flat pad |
| Contact stress | 14.5 ksi (99.6 MPa) |

Hence, by using ductile tribological electro-composite coatings on compliant structural seals, the seal performance can be enhanced with a simultaneous reduction of manufacturing costs. The coating can take the shape of whatever shape the exterior surface of the seal is formed into without masking the seal, the ductile nature of the coating allows the seal to bend without compromising the coating, and the coating is preferably used in the as-coated condition with little or no surface finish. The electro-composite coating is preferably applied on the outer sealing surfaces by electrolytic codeposition of cobalt and cobalt alloys containing a fine dispersion of particles such as, chromium carbide, silicon carbide, tungsten carbide, carbon graphite and the like, suitable for tribological applications. The hardness value of the coating may particularly be in the range of about 300-500 VHN such that the coated seal is suitable for running against uncoated counterfaces/flanges or other surfaces. The coating may particularly include a volume fraction of tribological particles within the matrix is in the range of about 10-30% and an average particle size in the range of about 2-5 µm and most particularly between about 3-4 µm.

As will be appreciated, the near-net shape tribological electro-composite coating for compliant structural seals provides increased performance, decreased labor and cost over thermal sprayed coatings.

It will be understood that various modifications may be made to the embodiments disclosed herein. For example, the tribological coatings may be varied as would be known to those of skill in the art. Therefore, the above description should not be construed as limiting, but merely as exemplifications of a preferred embodiment. Those skilled in the art will envision other modifications within the scope, spirit and intent of the invention.

What is claimed is:

1. A method of coating a flexible component comprising the steps of:
   providing an electrolytic bath including metallic ions and tribological particles in suspension;
   providing a pair of anodes;
   placing the flexible structure in the bath between the anodes, the flexible structure acting as the cathode and including an outer surface in proximity to the anodes and an inner surface, opposite the outer surface;
   agitating the electrolytic bath so as to keep the majority of metallic ions and tribological particles in suspension;
   applying sufficient electrical current such that the metallic ions and tribological particles migrate toward the flexible structure and are codeposited as a coating substantially only on the outer surface of the flexible structure as a composite coating with uniformly dispersed tribological particles with over 50% of the tribological particles having a size less than about 4 µm,
   controlling the time and the density of the electrical current in order to produce a coating of a desired thickness on the outer surface of the flexible component; and
   further comprising the step of maintaining the current density in the range of about 25-144 amps/sq. ft, maintaining a pH of the bath in the range of about 0.8-2, and maintaining the temperature of the bath in the range of about 120-180° F.

2. The method of claim 1, wherein the flexible component is a compliant seal including one or more outer convolutions.

3. The method of claim 2, wherein the coating has a substantially uniform thickness over the outer surface including the one or more outer convolutions.

4. The method of claim 3, wherein the coating has a substantially uniform thickness of about 0.005".

5. The method of claim 2, wherein only the outer sealing surface of the seal is coated.

6. The method of claim 1, wherein the volume fraction of tribological particles within the composite coating is in the range of about 10-30%.

7. The method of claim 1, wherein the tribological particles are selected from the group consisting of carbides, solid lubricants, oxides and nitrides.

8. The method of claim 1, comprising generating the composite coating on the outer surface of the flexible structure, the composite coating having a hardness in the range of about 300-500 VHN.

9. The method of claim 1, wherein maintaining the pH of the bath in a range of about 0.8-2 comprises maintaining the pH of the bath in a range of about 0.8-1.2.

10. The method of claim 1, wherein maintaining the pH of the bath in a range of about 0.8-2 comprises maintaining the pH of the bath in a range of about 1.0-1.2.

* * * * *